(12) United States Patent
Hosomi et al.

(10) Patent No.: US 6,547,022 B2
(45) Date of Patent: Apr. 15, 2003

(54) VEHICLE TRACTION CONTROL APPARATUS AND METHOD OF TRACTION CONTROL

(75) Inventors: Kazushi Hosomi, Toyota (JP); Akira Nagae, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 33 days.

(21) Appl. No.: 09/885,938

(22) Filed: Jun. 22, 2001

(65) Prior Publication Data

US 2001/0054520 A1 Dec. 27, 2001

(30) Foreign Application Priority Data

Jun. 27, 2000 (JP) ........................................ 2000-192509

(51) Int. Cl.[7] .............................................. B60K 41/20
(52) U.S. Cl. ..................... 180/197; 303/113.2; 701/78; 701/83
(58) Field of Search .............................. 701/71, 78, 79, 701/83; 303/20, 113.2; 180/197

(56) References Cited

U.S. PATENT DOCUMENTS

| 3,632,176 A | * | 1/1972 | Gaeke ........................ 303/21 A |
| 5,002,148 A | * | 3/1991 | Miyake et al. ................ 180/197 |
| 5,151,861 A | * | 9/1992 | Danno et al. ............ 364/426.02 |
| 5,303,794 A | * | 4/1994 | Hrovat et al. ................ 180/197 |
| 5,320,422 A | * | 6/1994 | Tsuyama et al. ............. 303/110 |
| 5,407,257 A | * | 4/1995 | Iwata ........................... 303/92 |
| 5,899,290 A | * | 5/1999 | Iwata ........................... 180/197 |
| 6,361,464 B1 | * | 3/2002 | Yoneyama .................... 475/116 |

FOREIGN PATENT DOCUMENTS

JP    5-229414 A    9/1993

* cited by examiner

Primary Examiner—Avraham Lerner
(74) Attorney, Agent, or Firm—Oliff & Berridge, PLC

(57) ABSTRACT

A vehicle traction control apparatus and method where an amount of pressure change of braking pressure is based on the amount of acceleration slip and the wheel acceleration. When the traction control is being performed and the braking force is being increased, an upper limit pressure increase amount of braking pressure is based on the engine revolution speed, and the estimated braking pressure, so that the calculated value is smaller if the revolution speed or the estimated braking pressure is greater. The upper limit pressure increase amount of braking pressure is corrected so that it is greater if the speed reduction ratio of the transmission is smaller. If the amount of pressure change of requested braking pressure is excessively high, and the amount of increase in braking pressure needs to be limited, the amount of pressure change of braking pressure is limited to the corrected upper limit pressure increase amount.

20 Claims, 4 Drawing Sheets

F I G. 3

| AMOUNT OF ACCELERATION SLIP $\Delta Vwi$ | WHEEL ACCELERATION $\alpha wi$ | | |
|---|---|---|---|
| | − | 0 | + |
| $C2 < \Delta Vwi$ | HOLD ($\Delta Pi=0$) | PRESSURE RAISE ($\Delta Pi>0$) | SHARP PRESSURE RAISE ($\Delta Pi>>0$) |
| $C1 < \Delta Vwi < C2$ | PRESSURE REDUCTION ($\Delta Pi<0$) | HOLD ($\Delta Pi=0$) | PRESSURE RAISE ($\Delta Pi>0$) |
| $\Delta V < C1$ | SHARP PRESSURE REDUCTION ($\Delta Pi<<0$) | PRESSURE REDUCTION ($\Delta Pi<0$) | HOLD ($\Delta Pi=0$) |

VEHICLE TRACTION CONTROL APPARATUS AND METHOD OF TRACTION CONTROL

INCORPORATION BY REFERENCE

The disclosure of Japanese Patent Application No. 2000-192509 filed on Jun. 27, 2000 including the specification, drawings and abstract is incorporated herein by reference in its entirety.

BACKGROUND OF THE INVENTION

1. Field of Invention

The invention relates to a traction control apparatus of a vehicle. More particularly, the invention relates to a braking force control type traction control apparatus and method.

2. Description of Related Art

In a known braking force control type traction control apparatus of a vehicle, such as a motor vehicle or the like, described in, for example, Japanese Patent Application Laid-Open No. HEI 5-229414, a vehicle speed, i.e., vehicle body speed, is detected, and the traction control is prohibited when the vehicle speed is in an intermediate-to-high speed range.

Since this traction control apparatus prohibits application of braking force to drive wheels in an intermediate-to-high vehicle speed range where the vehicle traveling inertia is great, the apparatus prevents early wear-out of brake pads and any damage to the engine caused by application of sharply increased loads to the brake mechanism and the drive system by the traction control.

In general, the revolution inertia of the engine increases with increases in the engine revolution speed. Therefore, the adverse effect caused on the engine and the drive system by sudden application of braking forces to the drive wheels by the traction control increases with increases in the engine revolution speed. However, the engine revolution speed does not necessarily increase with increases in the vehicle speed.

The aforementioned conventional traction control apparatus is designed so that the traction control is prohibited when the vehicle speed is in a relatively high speed range. Therefore, although the conventional traction control apparatus is able to prevent the occurrence of an excessively great load on the breaking mechanism when the vehicle traveling inertia is great, and braking force is applied to the drive wheels, the conventional traction control apparatus is not able to effectively and reliably reduce the adverse effect of the traction control on the engine and the drive system.

Furthermore, due to the aforementioned design of the conventional traction control apparatus in which the traction control is prohibited when the vehicle speed is in a relatively high speed range as mentioned above, there is another problem that can occur when using the conventional apparatus. That is, if drive slip occurs when the vehicle speed is relatively high, the conventional traction control apparatus is not able to apply braking force to the drive wheels at all, so that the drive slip cannot be reduced.

SUMMARY OF THE INVENTION

Accordingly, it is an object of the invention to effectively and reliably prevent the adverse effect of the traction control on the engine and/or the drive system, and reduce the drive slip by controlling the increasing rate of braking force applied to drive wheels in accordance with the engine revolution speed.

In accordance with a first mode of the invention, a traction control apparatus and method of a vehicle for reducing a drive slip of a drive wheel by applying a braking force to the drive wheel includes detecting an engine inertia force, and reducing a rate of increasing the braking force during a traction control if the engine inertia force is high, compared with a case where the engine inertia force is low.

According to the above-described mode, if the engine inertia is high, e.g., if the engine revolution speed or the engine-generated torque is high, the braking force increasing rate during the traction control is reduced, in comparison with a case where the engine inertia force is low, e.g., if the engine revolution speed or the engine generated torque is low. Therefore, the adverse effect caused by application of a sharply increased load to the engine and/or the drive system during the traction control is effectively and reliably reduced. Furthermore, when the engine inertia force is great, the braking force applied to the drive wheels is not reduced, but the braking force gradually increases to a needed value. Therefore, the drive slip is effectively and reliably reduced, in comparison with a case where when the engine inertia force is great the traction control apparatus is prohibited or the braking force is reduced.

In the above-described mode, a controller may reduce the rate of increasing the braking force during the traction control if the braking force applied to the drive wheel is high, compared with a case where the braking force applied to the drive wheel is low.

Thus, when the braking force applied to the drive wheel is great, the braking force increasing rate during the traction control is reduced, compared with the increasing rate in a case where the braking force is small. Therefore, the adverse effect caused by application of a sharply increased load to the engine and/or the drive system during the traction control can be more effectively and reliably reduced than in the above-described first mode.

In the above-described mode, the controller can detect a speed reduction ratio of a transmission apparatus, and increase an amount of reduction of the rate of increasing the braking force during the traction control when the speed reduction ratio is great, compared with a case where the speed reduction ratio is small.

In general, even if the engine revolution speed is fixed, the adverse effect caused on the engine and the drive system by application of braking force to the drive wheel is greater in the case of a great speed reduction ratio of the transmission than in the case of a small speed reduction ratio. Accordingly, the amount of reduction of the braking force increasing rate during the traction control is made greater in the case of a great speed reduction ratio of the transmission than in the case of a small speed reduction ratio. Therefore, the adverse effect caused by application of a sharply increased load to the engine and/or the drive system during the traction control can be more effectively and reliably reduced, in comparison with a case where the speed reduction ratio of the transmission is not taken into consideration.

In the above-described mode, the controller may reduce the rate of increasing the braking force during the traction control, by reducing an upper limit of the rate of increasing the braking force.

Therefore, the braking force increasing rate during the traction control is reduced by reducing the upper limit of the braking force increasing rate. Hence, the increasing rate of the braking force applied to the drive wheel during the traction control can be reliably reduced.

In the above-described mode, the controller may reduce the rate of increasing the braking force during the traction control so that the rate of increasing the braking force decreases with increases in the engine revolution speed.

Furthermore, the braking force increasing rate-reducing device may reduce the rate of increasing the braking force during the traction control so that the rate of increasing the braking force decreases with increases in the braking force applied to the drive wheel.

The braking force applied to the drive wheel may be estimated based on the rate of increasing the braking force, and on a control time based on the rate of increasing the braking force.

Furthermore, the controller may increase the amount of reduction of the rate of increasing the braking force during the traction control with increases in the speed reduction ratio of the transmission apparatus.

Still further, the controller may set the upper limit of the rate of increasing the braking force, in accordance with an engine revolution speed and the drive force applied to the drive wheel.

The controller may also correct the upper limit of the rate of increasing the braking force, in accordance with the speed reduction ratio of the transmission apparatus.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a table showing relationships of the amount of acceleration slip $\Delta Vwi$ and the wheel acceleration $\alpha wi$ of a drive wheel with the amount of pressure change $\Delta Pi$ of braking pressure;

DETAILED DESCRIPTION OF PREFERRED EMBODIMENTS

A preferred embodiment of the invention will be described hereinafter with reference to the accompanying drawings.

Figure 1A:
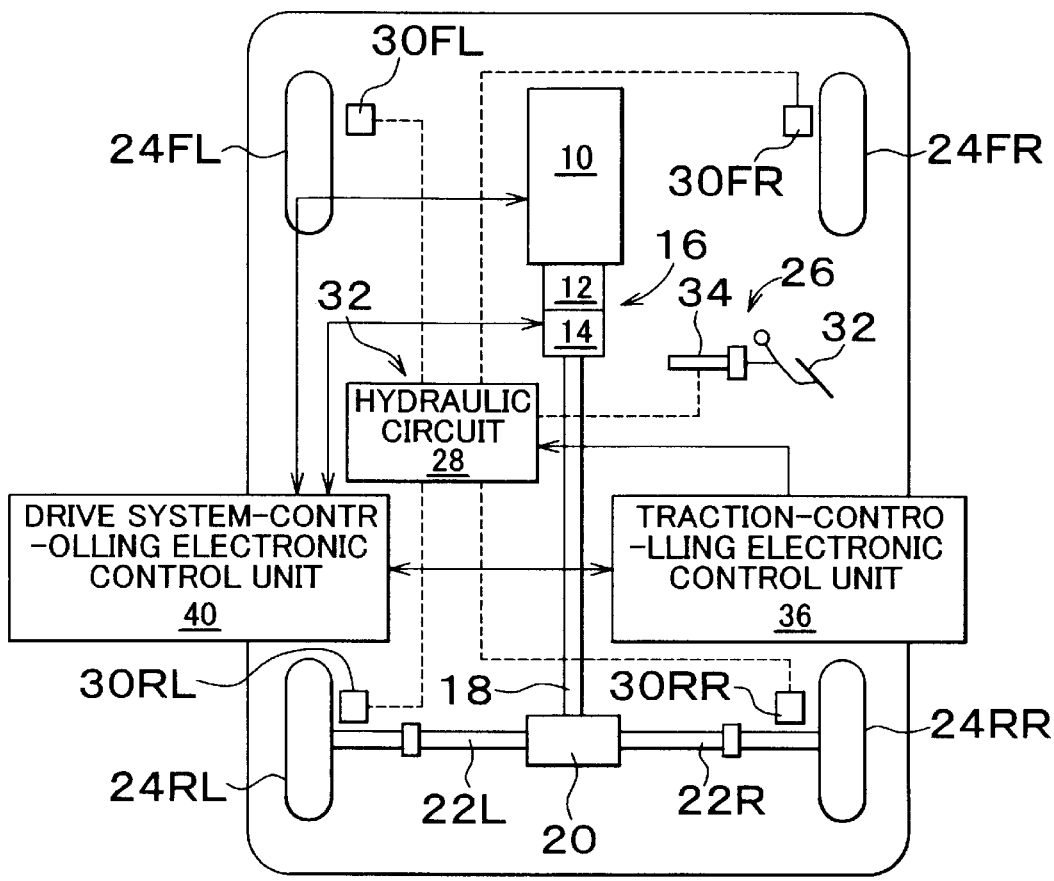
FIG. 1A is a schematic illustration of a construction of an embodiment of the traction control apparatus of the invention applied to a rear-wheel-drive vehicle.
Figure 1B:
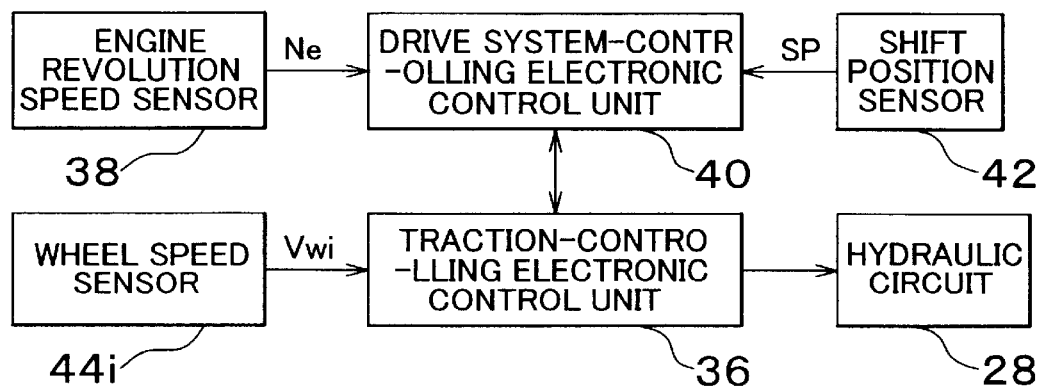
FIG. 1B is a block diagram of a control system of the embodiment.

FIG. 1A is a schematic illustration of an embodiment of the traction control apparatus of the invention applied to a rear-wheel-drive vehicle. FIG. 1B is a block diagram of a control system of the embodiment.

Referring to FIGS. 1A and 1B, drive power of an engine 10 is transferred to a propeller shaft 18 via an automatic transmission 16 that includes a torque converter 12 and a transmission mechanism 14. Drive power of the propeller shaft 18 is transferred to a rear right axle 22R and a rear left axle 22L via a differential 20, thereby driving right and left rear wheels 24RR, 24RL that are drive wheels.

Right and left front wheels 24FR, 24FL are driven wheels, and wheels for steering as well. Although not shown in FIGS. 1A and 1B, the front wheels 24FR, 24FL are turned by a rack-and-pinion type power steering device that is driven in response to the turning of a steering wheel performed by an operating person, via tie rods.

Braking force on the right and left front wheels 24FR, 24FL and the right and left rear wheels 24RR, 24RL is controlled by controlling the braking pressure on wheel cylinders 30FR, 30FL, 30RR, 30RL via a hydraulic circuit 28 of a braking apparatus 26. Although not shown in FIGS. 1A and 1B, the hydraulic circuit 28 includes an oil reservoir, an oil pump, various valve devices, etc. The braking pressure on each wheel cylinder is usually controlled by a master cylinder 34 that is driven in accordance with the depressing operation performed on a brake pedal 32 by an operating person. The braking pressure on each wheel cylinder is also controlled by a traction-controlling electronic control unit 36 when necessary.

The traction-controlling electronic control unit 36 receives input of an engine revolution speed Ne-indicating signal detected by an engine revolution speed sensor 38 provided on the engine 10, via a drive system-controlling electronic control unit 40. Furthermore, the traction-controlling electronic control unit 36 receives input of a shift position P-indicating signal detected by a shift position sensor 42 provided on the transmission mechanism 14 via the drive system-controlling electronic control unit 40. Finally, the traction-controlling electronic control unit 36 further receives input of signals indicating the wheel speeds Vwfr, Vwfl, Vwrr, Vwrl of the right and left front wheels 24FR, 24FL and the right and left rear wheels 24RR, 24RL from wheel speed sensors 44i (i=fr, fl, rr, rl).

Each of the traction-controlling electronic control unit 36 and the drive system-controlling electronic control unit 40 may be formed by a drive circuit and a well-known microcomputer that includes a CPU, a ROM, a RAM, and an input/output device that are interconnected by a bidirectional common bus.

Figure 4:
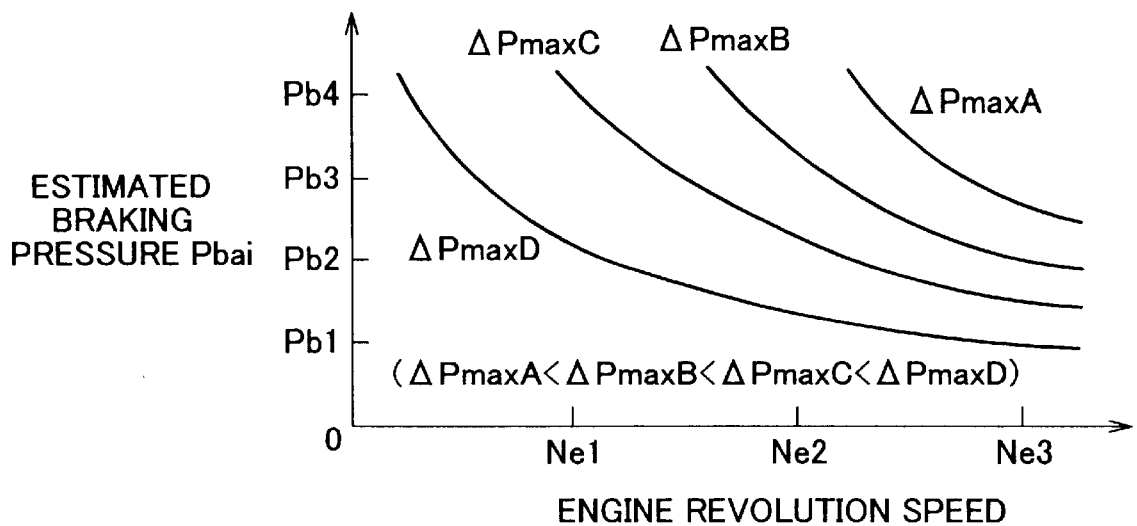
FIG. 4 is a graph indicating relationships of the engine revolution speed Ne and the estimated braking pressure Pbai with the upper limit pressure increase amount $\Delta Pmaxi$.

The traction-controlling electronic control unit 36 uses a traction control process illustrated in FIG. 3 and a map indicated in FIG. 4. If the drive slip of a drive wheel, that is, the rear right wheel 24RR or the rear left wheel 24RL, is excessively great, the traction-controlling electronic control unit 36 applies a predetermined braking force to that wheel by controlling the braking pressure on the corresponding wheel cylinder 30RR or 30RL in accordance with the degree of the drive slip, so as to reduce the drive slip.

In this case, the traction-controlling electronic control unit 36 reduces the increasing rate of braking force so that the increasing rate of braking force during the traction control decreases with increases in the engine revolution speed Ne, and so that the increasing rate of braking force during the traction control decreases with increases in the braking force applied to the drive wheel. Furthermore, the traction controlling electronic control unit 36 increases the amount of reduction of the increasing rate of braking force during the traction control with increases in the speed reduction ratio of the transmission mechanism 14.

A traction control process of this embodiment will next be described with reference to the flowchart shown in FIG. 2. The control illustrated by the flowchart of FIG. 2 is started upon the turning-on of an ignition switch (not shown), and is executed at every predetermined length of time.

Figure 2:
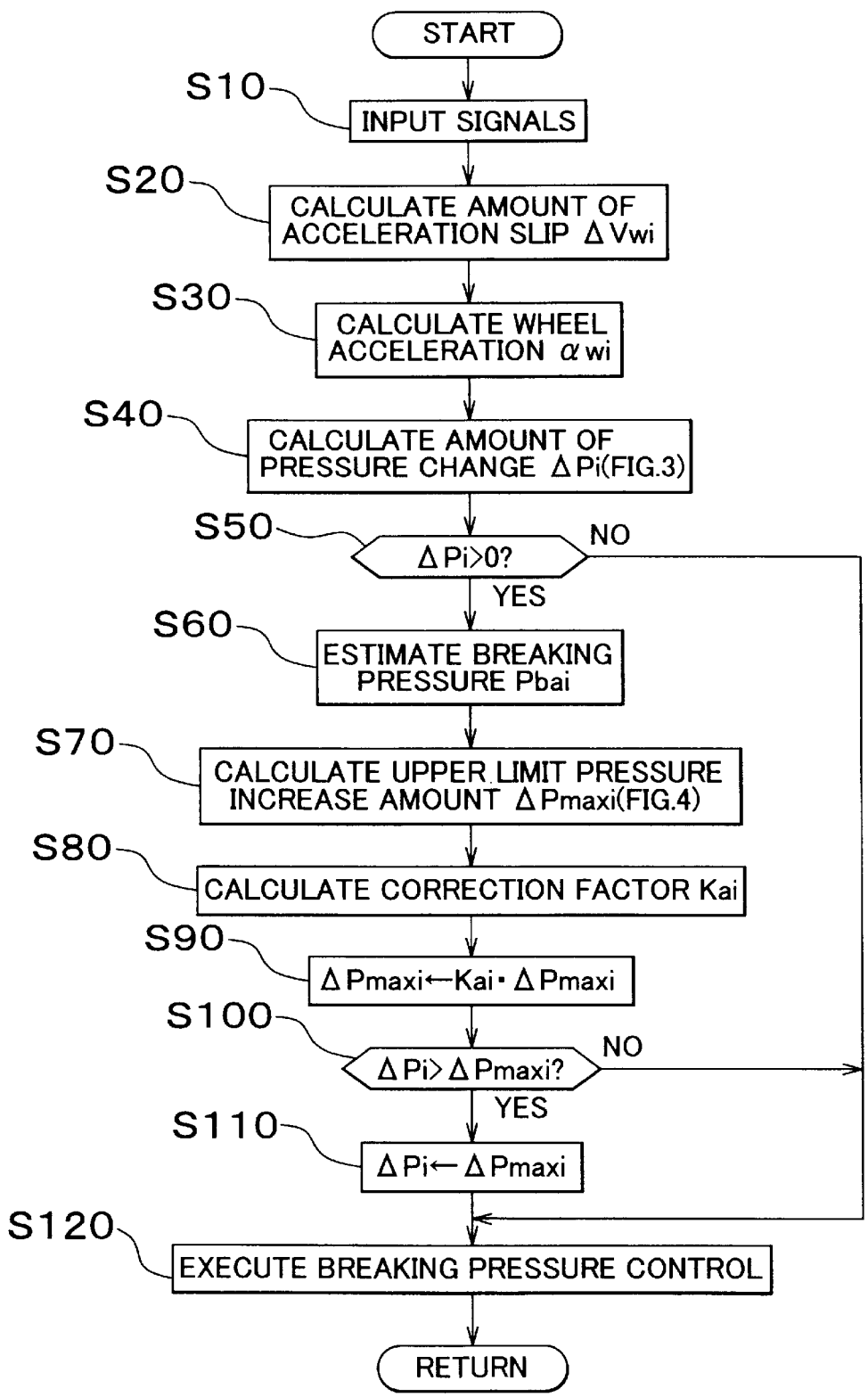
FIG. 2 is a flowchart illustrating a traction control routine in the embodiment.

Furthermore, the process illustrated by the flowchart of FIG. 2 is performed on the right and left rear wheels, for example, in the sequence of the rear left wheel and the rear right wheel.

First, in step 10, the traction-controlling electronic control unit 36 inputs the engine revolution speed Ne-indicating signal detected by the engine revolution speed sensor 38. Subsequently in step 20, a vehicle body speed Vb that serves as a reference in the traction control is calculated based on the wheel speed Vwfr and Vwfl of the right and left front wheels 24FR, 24FL, that is, the driven wheels, in a manner known in the art. Furthermore, an amount of acceleration slip $\Delta$ Vwi (i=rr, rl) of the right or left rear wheel is calculated as in Equation (1).

$$\Delta Vwi = Vwi - Vb \tag{1}$$

In step 30, based on the wheel speed Vwrr of the rear right wheel or the wheel speed Vwrl of the rear left wheel, wheel acceleration $\alpha$wi (i=rr, rl) is calculated, for example, as a time differential value of the wheel speed.

In step 40, based on the amount of acceleration slip $\Delta$Vwi and the wheel acceleration $\alpha$wi of the rear wheel, an amount of pressure change $\Delta$Pi (i=rr, rl) in the braking pressure on the right or left rear wheel with reference to FIG. 3.

In FIG. 3, a reference value C1 for the determination regarding the amount of acceleration slip $\Delta$Vwi is a negative constant, and a reference value C2 for the determination is a positive constant. The amount of pressure change $\Delta$Pi is calculated so that the value provided by the calculation is smaller (negative value) if the amount of acceleration slip $\Delta$Vwi is smaller within a range below the reference value C1, and so that the value provided by the calculation is greater (positive) if the amount of acceleration slip $\Delta$Vwi is greater within a range above the reference value C2. Furthermore, although not shown in FIG. 3, the amount of pressure change $\Delta$Pi of braking pressure is calculated so that the calculated value becomes smaller (negative) if the wheel acceleration $\alpha$wi is negative and the absolute value thereof is greater, and so that the calculated value becomes greater (positive) if the wheel acceleration $\alpha$wi is positive and the magnitude thereof is greater.

In step 50, it is determined whether the amount of pressure change $\Delta$Pi of braking pressure is positive. That is, it is determined whether the traction control is presently increasing the braking pressure. If it is determined that it is negative, the process proceeds to step 120. If it is determined that the breaking pressure is positive, the process proceeds to step 60, in which an estimated value Pbai of braking pressure is calculated based on the amount of pressure change $\Delta$Pi of braking pressure occurring after the traction control has started, and based on the time of the control based on the amount of pressure change.

In step 70, based on the engine revolution speed Ne and the estimated braking pressure Pbai, an upper limit pressure increase amount $\Delta$Pmaxi (i=rr, rl) is calculated with reference to FIG. 4. In FIG. 4, the upper limit pressure increase amounts $\Delta$PmaxA to $\Delta$PmaxD have a relationship in magnitude of 0<$\Delta$PmaxA<$\Delta$PmaxB<$\Delta$PmaxC<$\Delta$PmaxD.

In the embodiment shown in the drawing, if the engine revolution speed Ne and the estimated braking pressure Pbai are in a region on the origin-side of the line of upper limit pressure increase amount $\Delta$PmaxD, the upper limit pressure increase amount $\Delta$Pmaxi is set to $\Delta$PmaxD. If the engine revolution speed Ne and the estimated braking pressure Pbai are in a region between the line of upper limit pressure increase amount $\Delta$PmaxD and the line of upper limit pressure increase amount $\Delta$PmaxC, the upper limit pressure increase amount $\Delta$Pmaxi is set to $\Delta$PmaxC. If the engine revolution speed Ne and the estimated braking pressure Pbai are in a region between the line of upper limit pressure increase amount $\Delta$PmaxC and the line of upper limit pressure increase amount $\Delta$PmaxB, the upper limit pressure increase amount $\Delta$Pmaxi is set to $\Delta$PmaxB.

If the engine revolution speed Ne and the estimated braking pressure Pbai are in a region between the line of upper limit pressure increase amount $\Delta$PmaxB and the line of upper limit pressure increase amount $\Delta$PmaxA, the upper limit pressure increase amount $\Delta$Pmaxi is set to $\Delta$PmaxA. If the engine revolution speed Ne and the estimated braking pressure Pbai are in a region above the line of upper limit pressure increase amount $\Delta$PmaxA, the upper limit pressure increase amount $\Delta$Pmaxi is set to "0". It is also practicable to calculate the upper limit pressure increase amount $\Delta$Pmaxi by proportional allocation if the engine revolution speed Ne and the estimated braking pressure Pbai are in a region between the line of upper limit pressure increase amount $\Delta$PmaxD and the line of upper limit pressure increase amount $\Delta$PmaxA.

In step 80, a positive correction factor Kai (i=rr, rl) for the upper limit pressure increase amount $\Delta$Pmaxi of braking pressure is calculated based on the shift position SP detected by the shift position sensor 42. Subsequently in step 90, the upper limit pressure increase amount $\Delta$Pmaxi of braking pressure is rewritten for correction into Kai·$\Delta$Pmaxi as in Equation (2). The correction factor Kai is calculated so that the valve provided by the calculation is smaller if the speed reduction ratio of the transmission mechanism 14 is greater.

$$\Delta Pmaxi = Kai \cdot \Delta Pmax \tag{2}$$

In step 100, it is determined whether the amount of pressure change $\Delta$Pi of braking pressure is greater than the corrected upper limit pre amount $\Delta$Pmaxi that has been corrected as described above. That is, it is determined whether the present situation is a situation in which the pressure increase amount of the braking pressure should be limited. If it is determined that no limitation is required, the process proceeds to step 120. If it is determined that the pressure increase amount of the braking pressure should be limited, the amount of pressure change $\Delta$Pi of braking pressure is set to the corrected upper limit pressure increase amount $\Delta$Pmaxi in step 110.

In step 120, the hydraulic circuit 28 is controlled so that the braking pressure Pbi (i=rr, rl) of the rear right wheel or the rear left wheel is changed by the amount of pressure change $\Delta$Pi, so that the braking force on the rear right wheel or the rear left wheel is controlled and therefore the drives slip is controlled.

In the embodiment shown in the drawings, the amount of pressure change $\Delta$Pi of braking pressure is calculated based on the amount of acceleration slip $\Delta$Vwi and the wheel acceleration $\alpha$wi of a wheel in steps 20 to 40. If the braking force is being increased during the traction control, affirmative determination is made in step 50, and the upper limit pressure increase amount $\Delta$Pmaxi of braking pressure is calculated based on the engine revolution speed Ne and the estimated braking pressure Pbai so that the value provided by the calculation is smaller if the engine revolution speed Ne, or the estimated braking pressure Pbai, is greater.

In steps 80 and 90, the upper limit pressure increase amount $\Delta$Pmaxi of braking pressure is corrected so that the corrected value decreases with increases in the speed reduction ratio of the transmission mechanism 14. If the requested amount of pressure change $\Delta$Pi of braking pressure is excessively high, and the amount of pressure change of braking pressure needs to be limited, affirmative determination is made in step 100, so that in step 110, the amount of pressure change $\Delta Pi$ of braking pressure is limited to the corrected upper limit pressure increase amount $\Delta Pmaxi$.

Therefore, in the embodiment shown in the drawings, the amount of increase in braking pressure per cycle, for example, the pressure increasing rate of braking pressure, decreases with increases in the engine revolution speed Ne during the traction control. Therefore, the embodiment effectively and reliably prevents great braking force from being abruptly applied to a drive wheel by the traction control where the engine revolution speed Ne is high and the revolution inertia of the engine 10 is great. Hence, the embodiment is able to effectively and reliably prevent a great load from being suddenly applied to the drive system, such as the engine 10, the automatic transmission 16, and the like.

Figure 5:
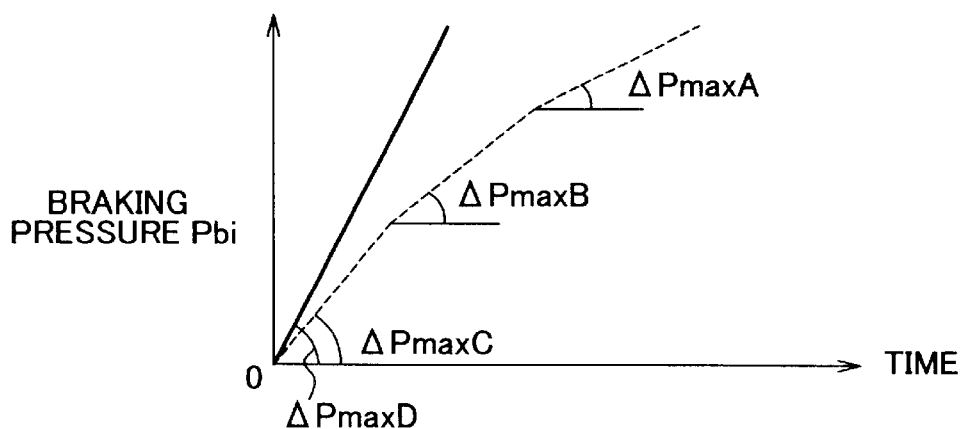
FIG. 5 is a graph indicating examples of changes in the braking pressure Pbi of a drive wheel where an engine revolution speed Ne is both low and high during traction control.

For example, FIG. 5 shows examples of changes in the braking pressure Pbi on a drive wheel in the embodiment shown in the drawings. In FIG. 5, a solid line indicates a case where the engine revolution speed Ne during the traction control is relatively low, and a broken line indicates a case where the engine revolution speed Ne during the traction control is relatively high. As can be understood from comparison between the solid line and the broken line, the embodiment shown in the drawings is able to reduce the gradient of increase in the braking pressure if the engine revolution speed Ne during the traction control is relatively high. If the engine revolution speed Ne during the traction control is relatively low, the embodiment is able to increase the braking pressure with good responsiveness.

According to the embodiment, if the engine revolution speed Ne is relatively high, the braking pressure increasing gradient during the traction control is reduced. However, since the braking pressure is gradually raised to a needed braking pressure, the drive slip can be reliably reduced in comparison with a case where the traction control is prohibited, or the braking pressure is reduced when the engine revolution speed Ne is relatively high.

In the embodiment, the braking pressure increasing rate is controlled so as to decrease with increases in the estimated braking pressure on the drive wheel. Therefore, it becomes possible to effectively and reliably prevent sudden application of high braking force to a drive wheel during the traction control, in comparison with a case where the braking force on a drive wheel is not taken into consideration.

In general, the load torque applied to the engine upon application of braking torque on the drive wheels increases with increases in the speed reduction ratio of the transmission mechanism. According to the embodiment, the control is performed such that the braking pressure increasing rate is reduced with increases in the speed reduction ratio of the transmission mechanism. Therefore, it becomes possible to further effectively and reliably prevent a high load from suddenly being applied to the engine or the drive system by the traction control, in comparison with a case where the speed reduction ratio of the transmission mechanism is not taken into consideration.

While a specific embodiment of the invention has been described above, it should be apparent to those skilled in the art that the invention is not limited to the above-described embodiment but various other embodiments are possible without departing from the scope of the invention.

For example, in the foregoing embodiment, steps 60 to 110 are executed when the traction control is being performed and the braking pressure is being increased. However, it is also practicable to adopt a modification wherein prior to step 40, it is determined whether the elapsed time following the start of the traction control is at most a predetermined time, and wherein only if the elapsed time following the start of the traction control is at most the predetermined time, the process proceeds to step 40.

Still further, in the foregoing embodiment, the correction factor Kai is calculated in step 80 so that the value resulting from the calculation is smaller if the speed reduction ratio of the transmission mechanism 14 is greater. Subsequently in step 90, the upper limit pressure increase amount $\Delta Pmaxi$ of braking pressure is rewritten into $Kai \cdot \Delta Pmaxi$. However, steps 80 and 90 may be omitted. Furthermore, it is also practicable to adopt a modification in which, instead of the processing of steps 80 and 90, a map corresponding to FIG. 4 is set separately for each shift position of the transmission mechanism 14, and a map is selected corresponding to the shift position of the transmission mechanism 14 prior to step 70.

In the foregoing embodiment, the amount of pressure change $\Delta Pi$ of braking pressure is calculated based on the amount of acceleration slip $\Delta Vwi$ of a drive wheel calculated in step 20, and the wheel acceleration $\alpha wi$ calculated in step 30. However, the amount of pressure change $\Delta Pi$ of braking pressure for reducing the drive slip of each drive wheel may be calculated in any manner known in the art.

Still further, in the foregoing embodiment, the upper limit pressure increase amount $\Delta Pmaxi$ of braking pressure is calculated based on the engine revolution speed Ne, and the estimated braking pressure Pbai in steps 60 and 70 so that the value resulting from the calculation is smaller if the engine revolution speed Ne or the estimated braking pressure Pbai is greater. Furthermore, in steps 100 and 110, the amount of increase in the braking pressure is limited to at most the upper limit pressure increase amount $\Delta Pmaxi$. However, it is also practicable to adopt a modification wherein a correction factor Kbi (i=rr, rl) is calculated such that the calculated correction factor is smaller if the engine revolution speed Ne, or the estimated braking pressure Pbai is higher, and wherein the amount of pressure change $\Delta Pi$ of braking pressure is corrected to $Kbi \cdot \Delta Pi$.

Still further in the foregoing embodiment, the braking pressure Pbi of a drive wheel is estimated in step 60 based on the amount of pressure change $\Delta Pi$ of braking pressure occurring after the traction control has started, and based on the time of control based on the amount of pressure change. However, the braking pressure Pbi of a drive wheel may be detected by a pressure sensor.

Furthermore, although in the foregoing embodiment, the vehicle is a rear-wheel-drive vehicle, the vehicle to which the invention is applied may also be a front-wheel-drive vehicle, a four-wheel-drive vehicle, etc.

In the illustrated embodiments, the controller (ECU36) is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A traction control apparatus of a vehicle for reducing a drive slip of a drive wheel by applying a braking force to the drive wheel, the apparatus comprising:
    a detector that detects an engine inertia force; and
    a controller that reduces a rate of increasing the braking force during a traction control if the engine inertia force is high, compared to when the engine inertia force is low.

2. The traction control apparatus according to claim 1, wherein the controller reduces the rate of increasing the braking force during the traction control so that the rate of increasing the braking force decreases with increases in the engine revolution speed.

3. The traction control apparatus according to claim 1, wherein the controller reduces the rate of increasing the braking force during the traction control if the braking force applied to the drive wheel is high, compared to a low braking force.

4. The traction control apparatus according to claim 3, wherein the controller reduces the rate of increasing the braking force during the traction control so that the rate of increasing the braking force decreases with increases in the braking force applied to the drive wheel.

5. The traction control apparatus according to claim 4, wherein the braking force applied to the drive wheel is estimated based on the rate of increasing the braking force and on a control time based on the rate of increasing the braking force.

6. The traction control apparatus according to claim 1, wherein the controller detects a speed reduction ratio of a transmission apparatus, and increases an amount of reduction of the rate of increasing the braking force during the traction control when the speed reduction ratio is great.

7. The traction control apparatus according to claim 6, wherein the controller increases the amount of reduction of the rate of increasing the braking force during the traction control with increases in the speed reduction ratio of the transmission apparatus.

8. The traction control apparatus according to claim 1, wherein the controller reduces the rate of increasing the braking force during the traction control, by reducing an upper limit of the rate of increasing the braking force.

9. The traction control apparatus according to claim 8, wherein the controller sets the upper limit of the rate of increasing the braking force, in accordance with an engine revolution speed and the drive force applied to the drive wheel.

10. The traction control apparatus according to claim 9, wherein the controller sets the upper limit of the rate of increasing the braking force, in accordance with the speed reduction ratio of the transmission apparatus.

11. A traction control method for a vehicle that reduces a drive slip of a drive wheel by applying a braking force to the drive wheel, the method comprising the steps of:
    detecting an engine inertia force; and
    reducing a rate of increasing the braking force during a traction control if the engine inertia force is high, compared to when the engine inertia force is low.

12. The traction control method according to claim 11, wherein the rate of increasing the braking force during the traction control is reduced so that the rate of increasing the braking force decreases with increases in the engine revolution speed.

13. The traction control method according to claim 11, wherein the rate of increasing the braking force during the traction control is reduced if the braking force applied to the drive wheel is high, compared to a low braking force.

14. The traction control method according to claim 13, wherein the rate of increasing the braking force during the traction control is reduced so that the rate of increasing the braking force decreases with increases in the braking force applied to the drive wheel.

15. The traction control method according to claim 14, wherein the braking force applied to the drive wheel is estimated based on the rate of increasing the braking force and on a control time based on the rate of increasing the braking force.

16. The traction control method according to claim 11, further comprising detecting a speed reduction ratio of a transmission apparatus, and increasing an amount of reduction of the rate of increasing the braking force during the traction control when the speed reduction ratio is great.

17. The traction control method according to claim 16, wherein the amount of reduction of the rate of increasing the braking force during the traction control increases with increases in the speed reduction ratio of the transmission apparatus.

18. The traction control method according to claim 11, wherein the rate of increasing the braking force during the traction control is reduced by reducing an upper limit of the rate of increasing the braking force.

19. The traction control method according to claim 18, wherein the upper limit of the rate of increasing the braking force is set in accordance with an engine revolution speed and the drive force applied to the drive wheel.

20. The traction control method according to claim 19, wherein the upper limit of the rate of increasing the braking force is corrected in accordance with the speed reduction ratio of the transmission apparatus.

* * * * *